United States Patent
Jones, Jr. et al.

[11] Patent Number: 5,996,745
[45] Date of Patent: Dec. 7, 1999

[54] PIEZOELECTRIC SHOCK ABSORBER VALVE

[75] Inventors: Edward C. Jones, Jr., Apple Valley, Calif.; Robert H. Girvin, Holliston, Mass.; James A. Vandergrift, Seattle, Wash.

[73] Assignee: K-2 Corporation, Vashon, Wash.

[21] Appl. No.: 08/857,125

[22] Filed: May 15, 1997

[51] Int. Cl.⁶ .................................................. F16D 57/00
[52] U.S. Cl. .................... 188/266.7; 188/322.15
[58] Field of Search .............. 188/266.7, 282.5, 188/316, 317, 319.1, 322.15

[56] References Cited

U.S. PATENT DOCUMENTS

| | | |
|---|---|---|
| 3,059,915 | 10/1962 | Kemelhor . |
| 3,240,295 | 3/1966 | Martinek et al. . |
| 3,376,031 | 4/1968 | Lee . |
| 3,614,615 | 10/1971 | Cass . |
| 3,874,635 | 4/1975 | Fletcher et al. . |
| 3,894,437 | 7/1975 | Hagy et al. . |
| 4,045,738 | 8/1977 | Buzzell . |
| 4,132,395 | 1/1979 | Fox, Jr. . |
| 4,565,940 | 1/1986 | Hubbard, Jr. . |
| 4,626,730 | 12/1986 | Hubbard, Jr. . |
| 4,894,577 | 1/1990 | Okamoto et al. . |
| 4,940,236 | 7/1990 | Allen . |
| 4,961,483 | 10/1990 | Yamaoka et al. ................. 188/266.7 |
| 5,054,785 | 10/1991 | Gobush et al. . |
| 5,097,171 | 3/1992 | Matsunaga et al. . |
| 5,154,263 | 10/1992 | Lizell ................................ 188/266.7 |
| 5,201,388 | 4/1993 | Malm . |
| 5,267,589 | 12/1993 | Watanabe . |
| 5,278,496 | 1/1994 | Dickmeyer et al. . |
| 5,381,089 | 1/1995 | Dickmeyer et al. . |
| 5,405,159 | 4/1995 | Klein et al. . |
| 5,445,401 | 8/1995 | Bradbury . |
| 5,449,189 | 9/1995 | Chen . |
| 5,450,009 | 9/1995 | Murkami . |
| 5,454,452 | 10/1995 | Öhlin . |
| 5,509,677 | 4/1996 | Bradbury . |
| 5,590,908 | 1/1997 | Carr . |
| 5,593,007 | 1/1997 | Siltanen . |

FOREIGN PATENT DOCUMENTS

| | | |
|---|---|---|
| 4109180A1 | 9/1991 | Germany . |
| 61-013041 | 1/1986 | Japan . |

*Primary Examiner*—Robert J. Oberleitner
*Assistant Examiner*—Mariano Sy
*Attorney, Agent, or Firm*—Darren J. Jones

[57] ABSTRACT

A shock absorber for a vehicle includes a fluid-filled cylinder having a closed end, a shaft extending partially into the cylinder, a valve attached to the first end of the shaft, and a power supply. The valve includes a valve piston and a bender. The valve piston includes at least one orifice extending therethrough. The bender is seated adjacent the orifice in the piston. The bender includes a piezoelectric material embedded therein. The piezoelectric material includes sides with conductive material disposed thereon. The power supply is attached to the conductive material across the piezoelectric material in the bender to apply a voltage across the piezoelectric material to change the stiffness of the bender. A sensor is also included for monitoring the displacement and velocity of the piston within the fluid-filled cylinder. The biasing force on the bender is changed on sensor readings according to predetermined logic sequence.

21 Claims, 8 Drawing Sheets

PIEZOELECTRIC SHOCK ABSORBER VALVE

FIELD OF THE INVENTION

The present invention relates to shock absorbers for vehicles, such as bicycles and motorcycles, and more particularly, to a dampener valve for a shock absorber to regulate the flow of damping fluid based on feedback regarding velocity and displacement of the shock absorber shaft relative to the shock absorber body.

BACKGROUND OF THE INVENTION

Front and rear suspensions have improved the performance and comfort of mountain bicycles. Over rough terrain the suspension system can improve traction and handling by keeping the wheels on the ground. A rider can more easily maintain control at higher speeds and with less effort when the suspension absorbs some of the shock encountered when riding. Ideally the suspension should react well to both (1) low amplitude, high frequency bumps and (2) high amplitude, low frequency bumps. However, these can be competing requirements for the damping systems in conventional shock absorbers.

Higher rebound damping is desirable for high amplitude, low frequency bumps than for low amplitude, high frequency bumps. With high frequency, low amplitude bumps, such as may be encountered on a washboard gravel fireroad, minimal damping may be preferable so the spring can quickly recover from a minor impact before the next is encountered. However, with a large bump (such as the size of a curb) increased rebound damping aids the rider by keeping the bike from forcefully springing back too quickly, causing loss of traction and control on the rebound. Compression damping will also stop the bike from bottoming out with large bumps and make for a smoother absorption of the bumps.

Some current shock absorbers that include springs and dampeners allow the rider to adjust rebound and/or compression damping before a ride. Other air shock absorbers include an on/off switch to disable the shock absorber all together. However, such preadjustment is at best a compromise; the rider must select better damping in one scenario at the expense of the other. A typical off-road mountain bike ride will include small bumps, medium, and large bumps, as well as possibly jumps, drop offs, and tight descending to ascending transitions. If the rider significantly reduces the damping to ride smoothly over high frequency, low amplitude bumps then the bike may lose traction and control when a large bump is encountered or may "bottom out" the shock absorber. If the rider increases the damping force of the shock absorber, then the system will not recover fast enough to quickly absorb high frequency bumps, the rider will be rattled, and the bike will lose traction.

Another limitation of current shock absorbers is evidenced by rider-induced bobbing: suspension movement caused by rider movement during pedaling. Related to this is pedal-induced suspension action: the cyclic forces on the chain pulling the rear swingarm up or down relative to the frame. If the damping in the shock absorber is greater, these influences will not be felt as much by the rider. However, a stiff suspension, especially at the beginning of the stroke of the shock absorber, can decrease the ability of the suspension to absorb small bumps well.

Attempts to overcome the current limitations in suspension systems have focused on swingarm linkages and pivot arrangements. At a significant cost, some amelioration of rider- or pedal-induced suspension action has resulted, but much less progress has been made on the dilemma of large and small bump absorption.

SUMMARY OF THE INVENTION

The present invention addresses the suspension challenges of both high frequency/low amplitude and low frequency/high amplitude shock absorption while also reducing rider- and pedal-induced suspension action. The present invention can be applied to most suspension configurations as it addresses these challenges with a unique, active damping shock absorber. The shock absorber is soft over small bumps and stiffens when encountering large shocks after the shock travels to a certain extent. The shock absorber stiffens further under extreme shock to avoid harsh bottoming out. Rebound damping may also be tuned independent of compression damping. The shock absorber changes damping during compression and rebound according to the speed and displacement of the shaft assembly relative to the housing during the suspension action.

The present invention includes a shock absorber for a vehicle. The shock absorber preferably includes a fluid-filled reservoir with an elongate member having a first end extending partially into the reservoir. A piston is secured to the first end of the elongate member and held within the reservoir. The piston is forced through the fluid-filled reservoir to dampen the shock absorber when shocks are encountered forcing the elongate member further within the reservoir. At least one fluid channel within the reservoir is provided through which fluid is forced when the piston moves through the reservoir. A bender valve at least partially blocking the flow of fluid through the fluid channel is secured within the reservoir. The bender valve has a response material embedded within at least a portion thereof. A power supply and a biasing means are attached thereto, the biasing means affecting the response material for biasing the bender valve to effect the flow through at least one fluid channel. Preferably, the response material includes a piezoelectric material. The biasing means includes the piezoelectric material having the power supply attached there across for applying a voltage thereto.

In one preferred embodiment of the invention, the fluid channel is disposed through the piston. In this manner, fluid flows through the piston when the piston is forced through the reservoir. The bender valve is seated against the fluid channel to regulate the flow therethrough. Preferably, the bender valve is disk-shaped with the piezoelectric material connected to the power supply across the thickness of the piezoelectric material. Thus, when voltage is applied across the piezoelectric material, the disk-shaped bender valve bends or biases in one direction or the other depending on the polarity of the applied voltage.

In an alternate embodiment of the invention, the piezoelectric material includes at least two arms within the disk-shaped bender valve.

Also in the preferred embodiment of the invention, the fluid channel includes a first end and a second end. Fluid enters the first end and exits through the second end as the piston is forced into the fluid reservoir. In the preferred embodiment, the bender valve is disposed adjacent the second end.

Another aspect of the preferred embodiment of the invention includes a sensor to detect shock absorber compression conditions. The sensor includes a logic circuit for changing the biasing force of the bender valve against the second end of the fluid channel when the sensor signals predetermined conditions of the piston relative to the fluid reservoir. Preferably, the sensor signals the bender valve to at least two discreet biasing forces. A first of the discreet biasing forces is obtained by applying a voltage across the piezoelectric material in one direction or one polarity. A second of the biasing forces is obtained by applying a voltage across the piezoelectric material with reverse polarity to the first. A third biasing force is obtained by applying no voltage across the piezoelectric material. Thus, the natural bending properties of the disk are employed without additional biasing forces due to the piezoelectric material.

In the preferred embodiment of the invention, the sensor detects piston displacement within the reservoir. The sensor connects to a logic circuit that sends a signal for changing the biasing force of the bender valve against the second end of the fluid channel when the sensor detects predetermined displacement of the piston. The sensor also detects velocity of the piston relative to the reservoir. The sensor includes a logic circuit for changing the biasing force of the bender valve against the fluid channel when the sensor detects predetermined velocity conditions. The sensor may also increase the biasing force of the bender valve against the fluid channel based on both predetermined displacement and velocity conditions of the piston relative to the reservoir.

In the preferred embodiment of the invention, the shock absorber is used with a bicycle. In this embodiment, the sensor increases the biasing force of the bender valve against the fluid channel in the region of piston displacement due to the set ride height. Thus, rider- or suspension-induced bobbing of the suspension reduces. However, once other external shock forces are applied, the damping proceeds to a lower level by reduction of biasing force against the fluid channel. Thus, the sensor decreases the biasing force of the bender valve against the fluid channel once the piston is past the region of displacement due to suspension compression from the rider's weight load resulting in the ride height.

A further aspect of the preferred embodiment includes piezoelectric material disposed in a first layer within the bender valve. A second layer of piezoelectric material is disposed within the bender valve also having a bottom face and a top face opposite the bottom face of the first layer and insulated therefrom. The second layer includes a conductive material on the top and bottom face thereof, with the conductive material being connected to the power supply for applying a voltage across the second layer. Voltage is selectively applied across the second layer in the same direction as that applied across the first layer.

The present invention may also be defined as a shock absorber for a vehicle with a fluid-filled cylinder, a shaft, a valve, and a power supply. The fluid-filled cylinder preferably has a closed end. The shaft has a first end extending partially into the cylinder. The valve is attached to the first end of the shaft. The valve includes a piston with at least one orifice extending therethrough and a bender seated adjacent the orifice in the piston. The bender has piezoelectric material embedded therein. The piezoelectric material includes sides with conductive material disposed thereon. The power supply is attached to the conductive material across piezoelectric material in said bender. In this way, the power supply may apply a voltage across the piezoelectric material to change the stiffness of the bender.

The present invention may also be described as a shock absorber system for controlling damping forces of shock absorbers. The shock absorber system includes at least one shock absorber, a fluid reservoir disposed in the shock absorber and a piston within the fluid reservoir. The piston is forced through the fluid reservoir when the shock absorber encounters shock. The fluid channel for moving fluid from one side of the piston to the other is also within the fluid reservoir. A piezoelectric bender valve with a portion positioned within the path of the flow of the fluid is provided to regulate the damping. The piezoelectric bending valve includes at least one layer of piezoelectric material with a conductive material on both its sides. A drive mechanism for operating the piezoelectric bending valve is also included. The drive mechanism includes a voltage amplifier for generating high voltage and selectively applying the voltage to the conductive material across the piezoelectric material. A first polarity application of the voltage causes the bender valve to be biased toward the flow fluid through the channel.

BRIEF DESCRIPTION OF THE DRAWINGS

The foregoing aspects and many attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

The shock absorber damping system of the present invention may be employed in a multitude of different applications. However, the system disclosed and described herein is particularly well suited to vehicles, especially bicycles of the mountain bike variety. The system is also well suited to motorcycle suspension systems, especially off-road motorcycles. Mountain bicycles will be referred to throughout this detailed description. However, it should be understood that mountain bikes are simply the preferred application and the same concepts and basic constructions can be used in other shock absorber applications.

The damping system of the present shock absorber is particularly advantageous with mountain bikes since large, medium, and small bumps, drops, and shock-producing surfaces are encountered during mountain bike riding. Typically, low amplitude bumps occur at a high frequency. For example, a washboard gravel road may have numerous, close together small bumps that create high frequency, low amplitude shocks at the wheels of the bicycle. Conversely, high amplitude bumps have a relatively lower frequency, since the size of the bump itself dictates that the bumps be somewhat spaced apart. A street curb is an example of a high amplitude, low frequency bump. Numerous rocks, bumps, roots, and other obstacles are encountered when mountain biking off-road. The shock absorber of the present invention is designed to handle all these bumps. Further, the shock absorber may also be programmed to reduce other undesirable cycling effects such as pogo action or bobbing, as well as chain-induced suspension action.

Figure 1:
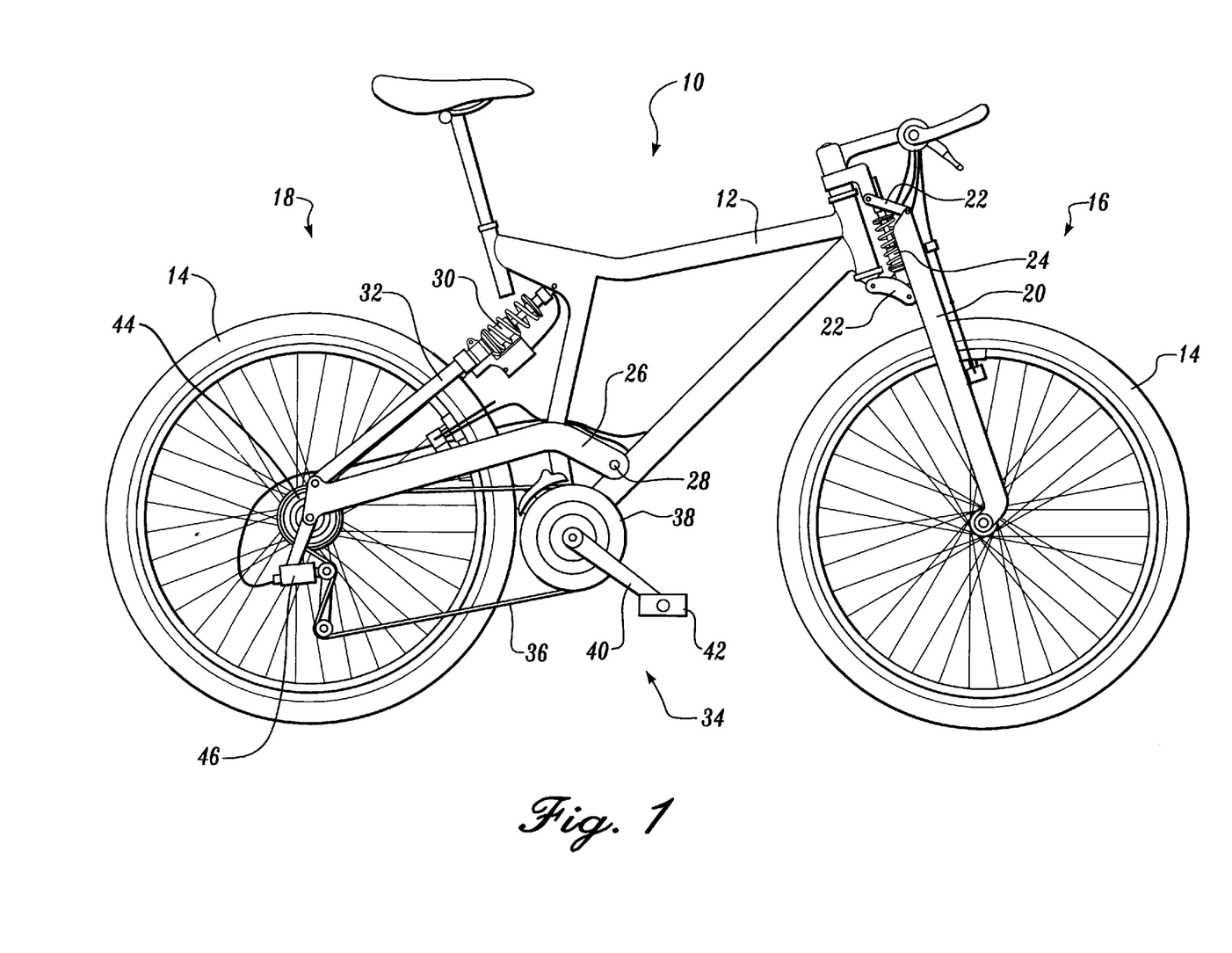
FIG. 1 is a side elevational view of the shock absorber of the present invention secured in the rear suspension of a bicycle.

FIG. 1 illustrates a mountain bike with the shock absorber of the present invention. Bicycle 10 includes a frame 12, wheels 14, a front suspension 16, and a rear suspension 18.

Front suspension 16 is attached to the head tube portion of frame 12 and includes forks 20 that extend downwardly from linkages 22 connecting forks 20 to the frame head tube. A front shock absorber 24 is disposed between linkages 22 to provide front suspension action. Both shock absorption and damping are provided by front shock absorber 24, as is described in detail below. Front suspension 16 may have many alternative configurations, such as telescoping forks, other linkage mechanisms, or shock absorbing stems. The same damping concepts discussed herein can be applied to these other arrangements.

Rear suspension 18 includes a rear swing arm 26 pivotally attached to frame 12 about a pivot 28. A rear shock absorber 30 is also attached at one end to frame 12. Shock stays 32 extend upwardly from the rearward end of swing arm 26 to the lower end of rear shock absorber 30. Thus, when swing arm 26 pivots upwardly about pivot 28, shock absorber 30 is compressed such that the rear wheel 14 is allowed to move relative to frame 12 to absorb and dampen shock. Again, alternative rear suspension systems can be employed with rear shock absorber 30. Other systems may include unified rear triangles, unified swing arm and chain stay arrangements, and other linkage assemblies. Leverage ratios on the shock absorber may change, for example, while still using the same core damping technology. The concepts herein can also be applied to pull shock absorbers. In all of these systems, damping of the suspension action is advantageous.

Bicycle 10 also includes a drive system 34. Drive system 34 is preferably constructed as is known in the art. Drive system 34 includes a chain 36 that extends around chain rings 38 that are attached to frame 12 via the bottom bracket. Cranks 40 are also secured to chain rings 38 with pedals 42 at the outer ends. Rear sprockets 44 are secured to the rear wheel 14 with a rear derailleur 46 for shifting the chain from one sprocket to another. Drive system 34 is relevant to shock absorption, particularly in the arrangement illustrated in FIG. 1, since the upper drive line of chain 36 extends beneath pivot 28 such that as force is applied to pedals 42, chain 36 slightly pulls suspension 18 downwardly. This can be advantageous as it helps to increase traction of rear wheel 14 on the riding surface. However, if the rider does not have smooth pedaling action, then cyclic forces on chain 36 may cause cyclic bobbing of rear suspension 18 as the bicycle is ridden. As will be explained in more detail below, the damping system of rear shock absorber 30 can help eliminate such chain-induced suspension action.

Figure 2A:
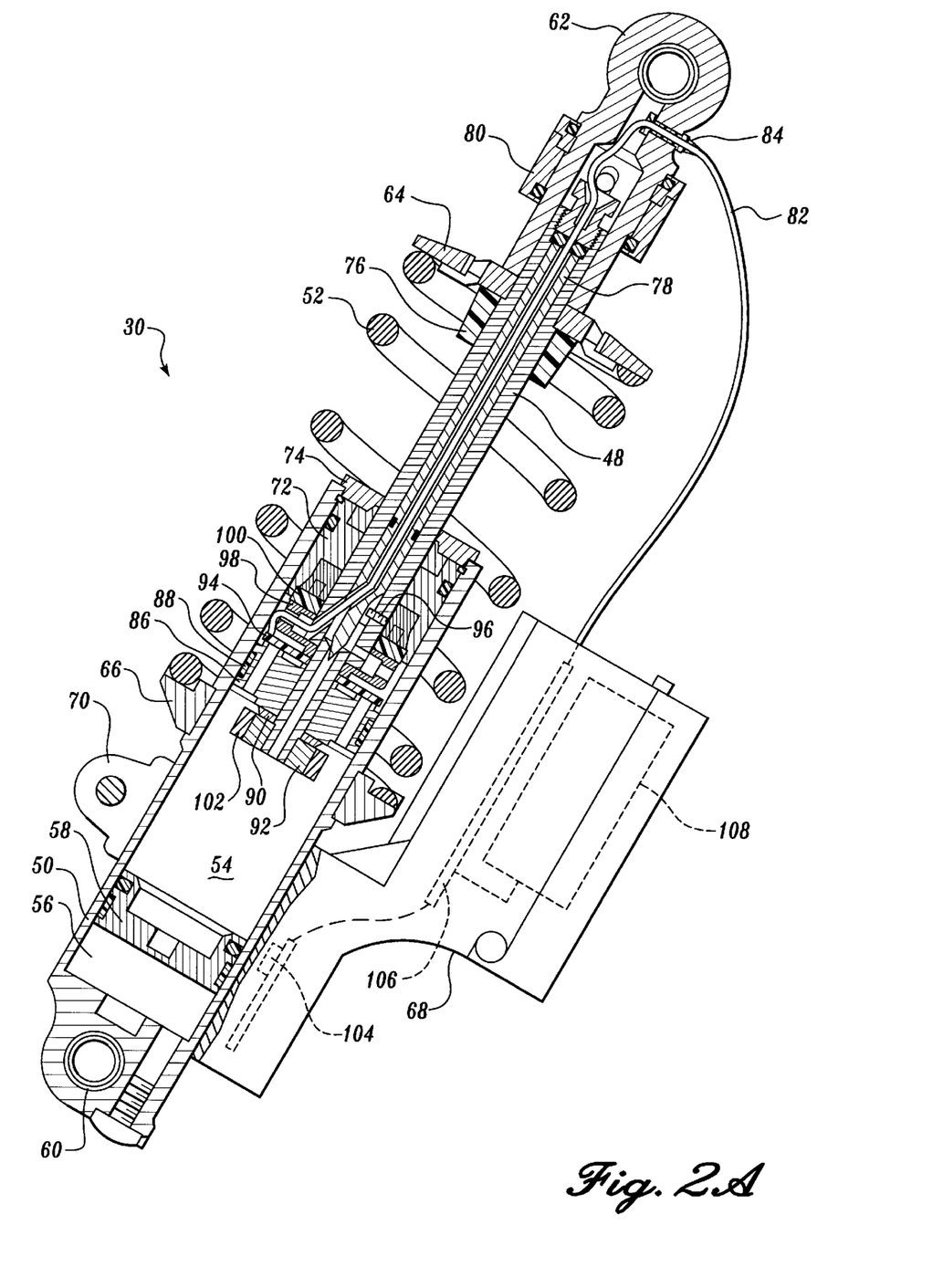
FIG. 2A is a cross sectional view of the shock absorber illustrated in FIG. 1.
Figure 2B:
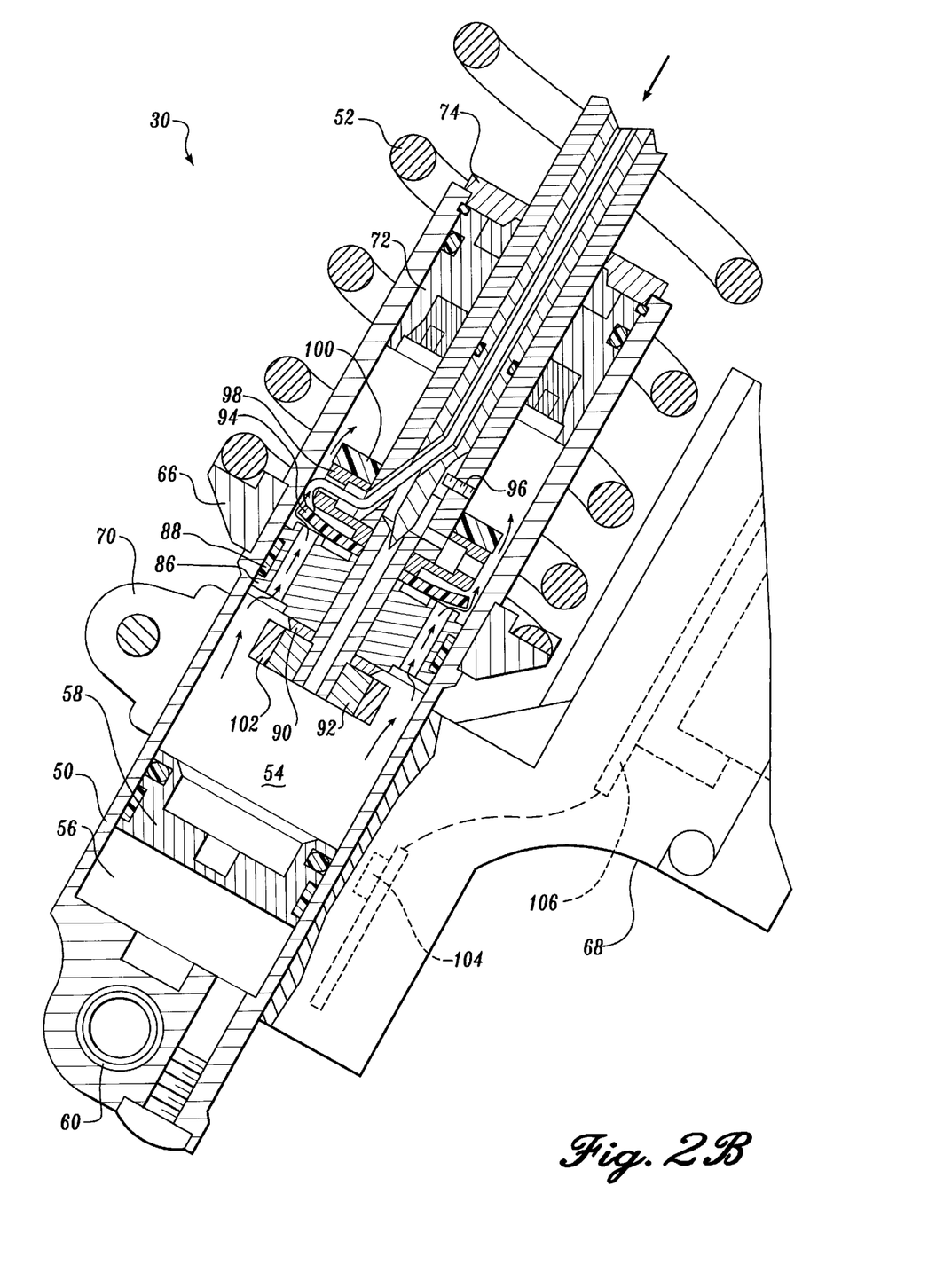
FIG. 2B is a partial cross sectional view of the shock absorber illustrated in FIG. 2A during a compression stroke.
Figure 2C:
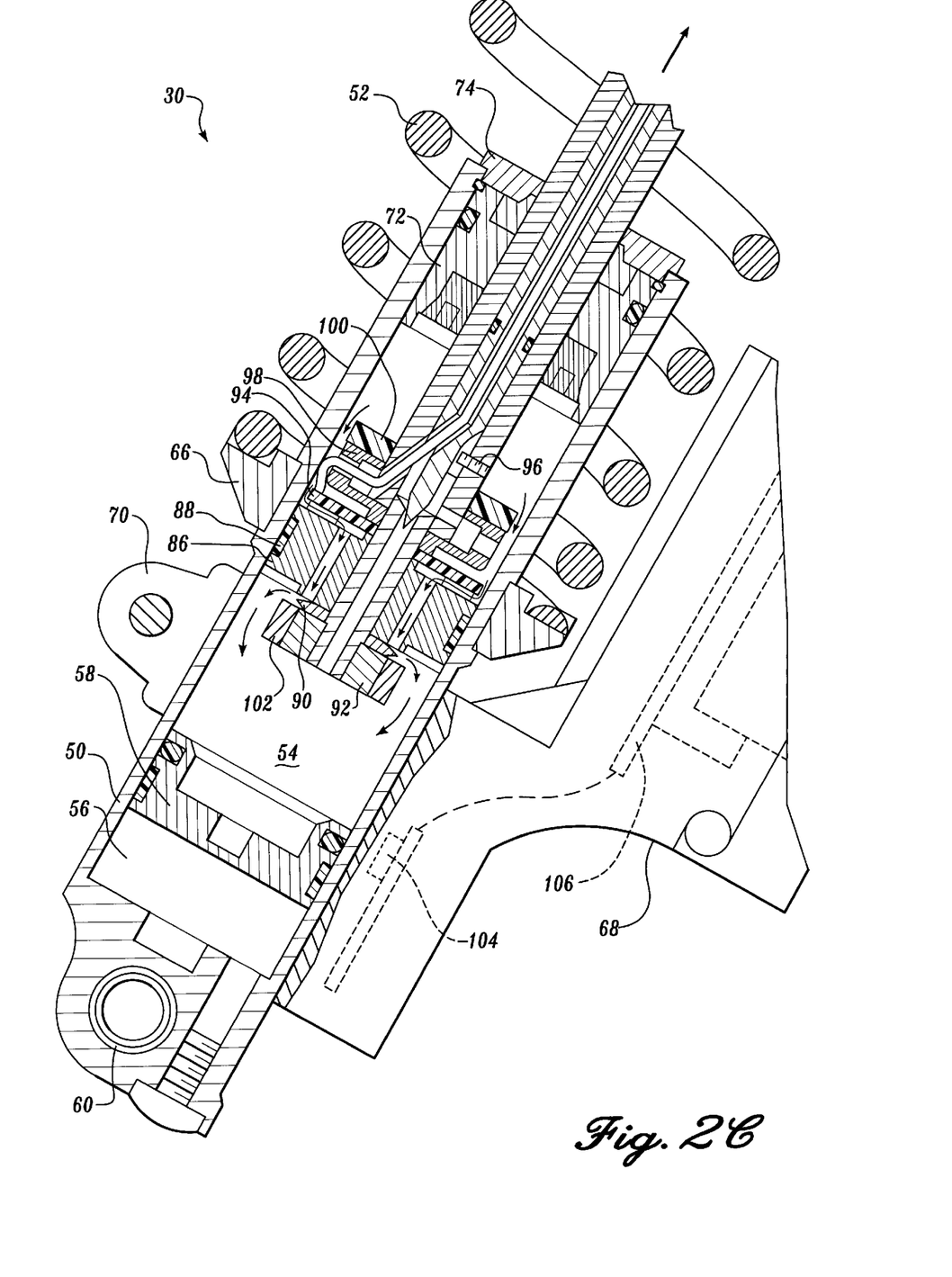
FIG. 2C is a partial cross sectional view of the shock absorber during a rebound stroke.

Referring now to FIGS. 2A–C, the details of the inner construction of shock absorber 30 will now be discussed. Note that while shock absorber 30 refers to the shock absorber used with the rear suspension of the bicycle illustrated in FIG. 1, the same or similar shock absorber can be employed on the front suspension. Externally, shock absorber 30 appears much like standard shock absorbers currently on the market. Many details of the shock absorber are much like those manufactured by Noleen Racing of Adelanto, Calif. Shock absorber 30 includes a shaft 48 extending into a reservoir housing 50. A spring 52 extends along shaft 48 and over a portion of reservoir housing 50. Spring 52 absorbs shock and provides rebound while shaft 48, extending into reservoir housing 50, provides damping as explained below.

Reservoir housing 50 encloses hydraulic reservoir 54 and gas chamber 56. Hydraulic reservoir 54 is separated from gas chamber 56 by a chamber seal 58. In the referred embodiment of the invention, both gas chamber 56 and hydraulic reservoir 54 are contained within the same cylindrical reservoir housing 50. Chamber seal 58 includes an O-ring to separate gas chamber 56 from hydraulic reservoir 54 and to allow chamber seal 58 to move within reservoir housing 50 as needed. Gas chamber 56 preferably holds nitrogen gas such that additional damping is provided when the gas is compressed due to a large shock. Alternatively, a gas chamber may be mounted outside reservoir housing 50 in its own chamber with an interconnecting channel as is well known in the art.

The outer end of reservoir housing 50 opposite shaft 48 includes a housing end mount 60 for mounting the end of rear shock absorber 30 either to a bicycle frame or to other suspension components. A shaft end mount 62 is provided on the opposite side of shock absorber 30 at the end of shaft 48. Note in FIG. 1 that shaft end mount 62 is mounted to frame 12 while housing end mount 60 is secured to shock stays 32.

Spring 52 is held on shaft 48 and reservoir housing 50 with spring stop 64 secured to shaft 48 at the end of shaft end mount 62 and preload wheel 66 at the opposite end of spring 52. Preload wheel 66 is threadably engaged on reservoir housing 50. Thus, by turning preload wheel 66, the preload in spring 52 can be adjusted.

An electronics housing 68 is also provided on shock absorber 30. Housing 68 holds the power supply and circuitry, as well as the sensor necessary to control the damping action of shock absorber 30. Housing 68 is secured to reservoir housing 50 with housing clamp 70 extending around the outside thereof between preload wheel 66 and housing end mount 60.

Hydraulic reservoir 54, when manufactured, includes an opening at only one end through which shaft 48 is inserted. A reservoir seal 72 (including the seal head, the scraper seal, and the O-ring) extends around shaft 48 and is held tightly within the open end of reservoir housing 50 in order to create an enclosed reservoir 54. A reservoir cap 74 is also included on the outside of reservoir seal 72. Reservoir cap 74 and reservoir seal 72 ensure that no hydraulic fluid escapes from hydraulic reservoir 54. O-rings are employed at critical locations to ensure the adequate sealing. Should shaft 48 extend all the way in to reservoir 54, reservoir cap 74 will abut a bottom out bumper 76 held on shaft 48 adjacent spring stop 64.

As with standard Noleen Racing shock absorbers, an adjustment needle 78 is housed within shaft 48, shaft 48 being hollow. Adjustment needle 78 regulates the bypass flow of hydraulic fluid within hydraulic reservoir past the piston 86. An adjustment wheel 80 is provided to move adjustment needle 78 longitudinally within shaft 48 in a conventional manner. An element not included in conventional shock absorbers, wire 82, extends from housing 68 through a wire seal 84 in shaft end mount 62. Wire 82 then extends through a hollowed central core of adjustment needle 78 to near the tip thereof. This wire electrically links the electronics within housing 68 to the dampener valve for control thereof. Since wire 82 extends out the side of adjustment needle 78, rotation of adjustment needle 78 must be kept in check. Therefore, pin 96 extends through the side of shaft 48 into a recess in the side of adjustment needle 78 such that wire 82 may be properly channeled to the side of bender 94. As will be explained below, wire 82 actually includes multiple wires within a tough, flexible housing.

Figure 3A:
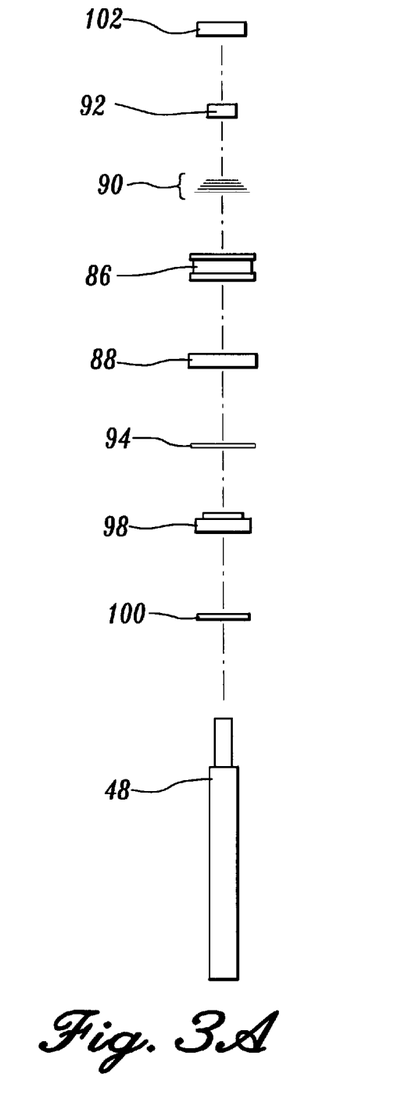
FIG. 3A is an exploded view of the dampener valve assembly.
Figure 3B:
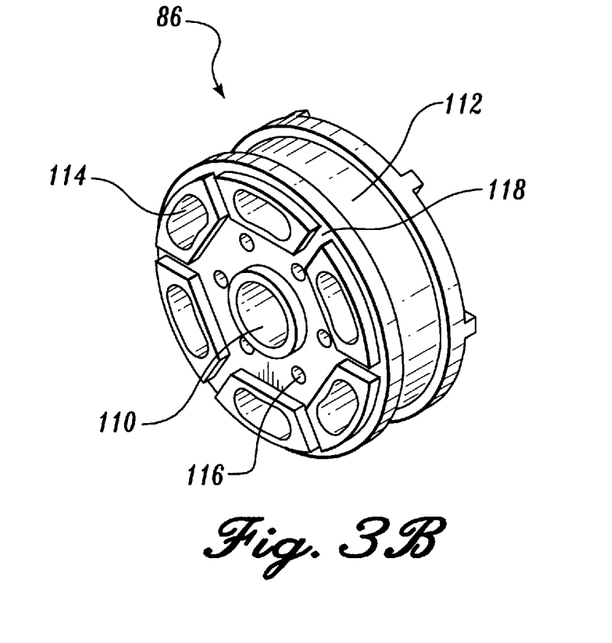
FIG. 3B is an isometric view of the piston body.

The piston assembly of shock absorber 30 is seen in its assembled configuration in FIGS. 2A–C and in an exploded view in FIG. 3A. FIG. 3B illustrates an enlarged view of a piston 86. As seen in FIGS. 2A–C and FIG. 3A, a band 88 constructed of a Teflon material is secured around piston 86. In the preferred embodiment of the invention, shim washers 90 are stacked against the innermost end of piston 86 (shim washers 90 are shown all together in FIGS. 2A–C such that they appear to be a single truncated cone). Shim washers 90 function in a conventional manner to regulate the flow of fluid through piston 86, especially during rebound as shaft 48 moves away from reservoir housing 50. A nut 92 is threadably engaged on the innermost end of shaft 48 to hold shim washers 90 securely against piston 86. Nut 92 thus holds the entire piston assembly on the end of shaft 48.

A bender 94 is secured on the opposite side of piston 86 from shim washers 90. Bender 94 will be discussed in more detail below in connection with FIG. 4. Bender 94 includes piezoelectric material that is connected to wire 82 in order to apply a voltage across bender 94. Bender 94 is preferably arranged on the shaft side of piston 86 in order to control the compression damping of the piston assembly when it travels through reservoir 54.

As seen in FIGS. 2A–C and 3A, Bleed spacer 98 is held on the shaft side of bender 94 and is seated on the shoulder of shaft 48 to hold the piston assembly between the shoulder of shaft 48 and nut 92. Bleed spacer 98 allows the bypass of fluid flow past adjustment needle 78, allows a conduit through which wire 82 extends to the side of bender 94, and rests on the shoulder of shaft 48 for holding the piston assembly in place. A flexible top out bumper 100 is force-fit onto shaft 48 below Bleed spacer 98. Top out bumper 100 is useful when shaft 48 is pushed all the way out to the end of its stroke by spring 52 such that bumper 100 contacts reservoir seal 72.

In the preferred embodiment of the invention, a sensor assembly is provided to detect both the displacement of shaft 48 and the piston assembly relative to the reservoir housing 50 as well as the velocity of shaft 48 and the piston assembly. In the preferred embodiment of the invention a giant magneto restrictive sensor (GMR) is employed. Other sensors may alternatively be used to detect either the displacement or velocity of shaft 48 relative to housing 50. For example, proximity sensors, variable reluctance sensors, or other magnetic or mechanical sensors may be used. GMR sensors are also referred to as magnetoresistive sensors. (Description of such sensors can be found in prior art, such as in U.S. Pat. No. 5,450,009 to Murakami, and in multiple journal articles. Examples of articles discussing such sensors include "Magnetic Field of Dreams," by John Carey, *Business Week*, Apr. 18, 1994; "The Attractions of Giant Magnetoresistance Sensors" by Ted Tingey, *Electrotechnology*, Vol. 7, part 5, pgs. 33–35, October–November 1996; and in "High Sensitivity Magnetic Field Sensor Using GMR Materials With Integrated Electronics," by Jay L. Brown, Proc. *IEEE International Symposium on Circuits and Systems* Vol. 3, pgs. 1864–1867, 1995.) The sensor and control arrangement preferably employed in the present invention includes a magnet 102 secured about nut 92 on the end of the piston assembly. A sensor 104 is secured within housing 68 adjacent reservoir housing 50 near the closed end thereof. Sensor 104 can alternatively be mounted at the end of housing 50. Sensor 104 is connected to circuit board 106. Circuit board 106 (or alternatively be a microprocessor chip that includes the microprocessor logic to control bender 94 based on the detection signal from sensor 104. Circuit board 106 is then in turn connected to wire 82 for connection to bender 94. The operation of circuit board 106 will be explained in more detail in connection with FIG. 6. A battery 108 is also held within electronics housing 68 in order to provide power to sensor 104 and to bender 94. Preferably, a conventional 9-volt battery is used within electronics housing 68 to provide the power required for the bender and the sensor.

Referring now to FIG. 3B further details of the functioning of the piston and valve assembly will be described. Piston 86 is the type sometimes used with shim washers 90. Piston 86 includes a shaft bore 110 that slides over the end of shaft 48 to be held thereon. Shaft bore 110 is disposed in the center thereof and is circular in cross-section. A circumferential recess surrounds the outer curved side of piston 86. Circumferential recess 112 is sized to secure Teflon band 88 therein. The face of piston 86 that is turned toward shaft 48 is illustrated in FIG. 3B. The large openings in piston 86 are the compression flow channels 114. These channels extend entirely through piston 86 and actually begin within recesses on the opposite side of piston 86 from that shown in FIG. 3B. Thus, during compression (when shaft 48 is being pressed into reservoir 54, see FIG. 2B) fluid easily enters channels 114 since the recesses allow the flow to go beneath shim washers 90 into channels 114. However, bender 94 is secured adjacent the shaft side of piston 86 so as to obstruct the flow of fluid through channels 114 at their exit ends.

By controlling the stiffness or bias of bender 94, the flow through compression flow channels 114 (see FIG. 2B) can be effectively controlled to increase or decrease the damping.

Rebound flow channels 116 also extend through piston 86. Note that these channels are held within rebound flow recess 118 so that bender 94 does not significantly obstruct the flow of fluid back through rebound flow channels 116 (see FIG. 2C). However, note that the size of these channels is somewhat smaller than that of compression flow channels 114 such that rebound damping is generally greater than compression damping. The flow through rebound flow channels 116 extend from the face shown in FIG. 3B to the opposite face as the piston assembly moves in the direction of shaft 48. Flow in this direction is obstructed by shim washers 90 which are deflected by the flow through rebound flow channels 116 and by some flow through compression flow channels 114. Rebound flow recess 118 not only extends around the entrance of rebound flow channels 116, but includes arms that extend between compression flow channels 114 such that flow may move around bender 94 for rebound action.

In an alternate embodiment of the invention, shim washers 90 may also be replaced by a bender such as bender 94 to more completely control rebound damping, as well as compression damping with the piston assembly.

In another alternate embodiment of the present invention, the flow channel or channels are disposed in the side of a modified reservoir housing. In this embodiment, the bender is positioned to regulate the flow of fluid from one side of the piston to the other through the channel in the housing as the piston is forced through a the reservoir. Control of the bender then affects the level of damping.

Figure 4:
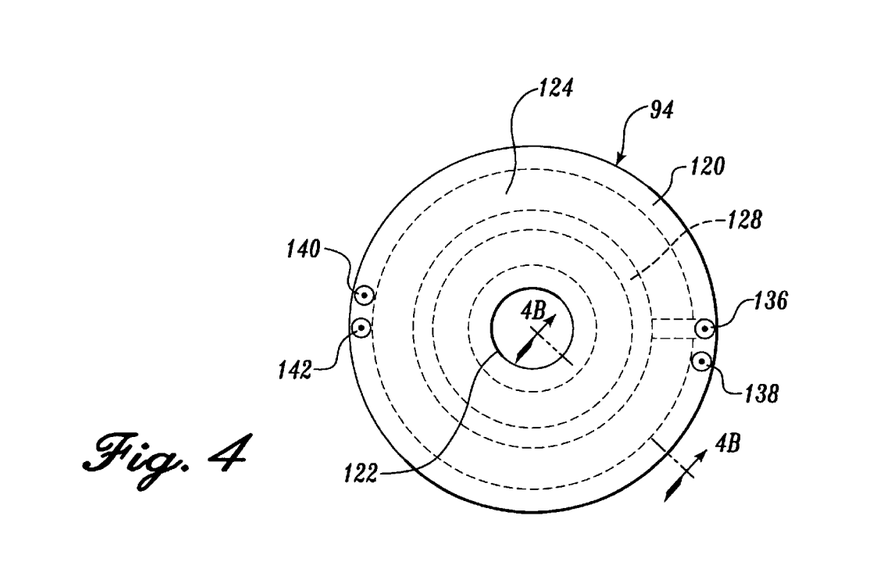
FIG. 4 is a plan view of the piezoelectric disk that is seated against the valve body.
Figure 5:
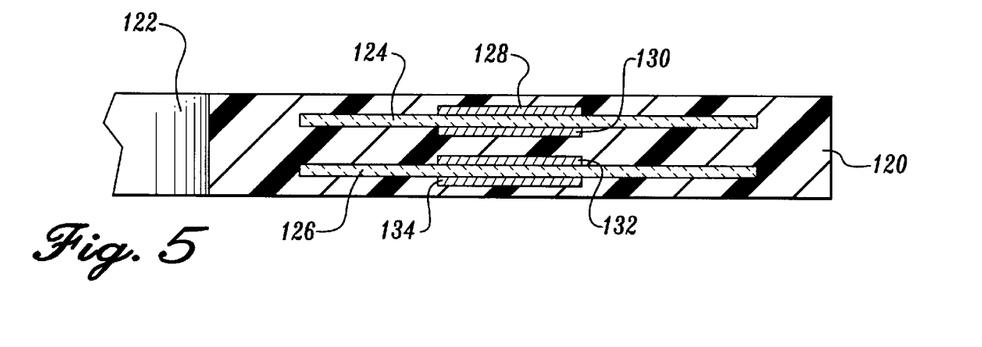
FIG. 5 is a partial, cross-sectional view of the valve disk illustrated in FIG. 4.

Referring now to FIGS. 4 and 5, the construction of bender 94 will be described. Bender 94 includes a disk 120 preferably constructed of a polyimide material. A Polyimide polymer is preferably used due to its toughness and electric insulating characteristics. Disk 120 includes a center aperture 122 which slides over the end of shaft 48 between piston 86 and Bleed spacer 98. Note that the top of Bleed spacer 98 includes a small cylindrical projection to space the outer portion of disk 120 from the remainder of Bleed spacer 98 to allow bender 94 to flex downwardly toward Bleed spacer 98.

Within disk 120 a piezoelectric top layer 124 and piezoelectric bottom layer 126 are held. Top layer 124 and bottom layer 126 are spaced from one another. Alternative embodiments of the invention include only a single piezoelectric layer or more than two piezoelectric layers. Piezoelectric layers 124 and 126 are also diskshaped in parallel planes to one another and parallel to the plane of disk 120. First and second electrodes 128 and 130 contact the upper and lower faces of top layer 124. Electrodes 128 and 130 are connected to circuit board 106 such that a voltage can be applied across piezoelectric top layer 124. As seen in FIG. 4, first and second connectors 136 and 138 are provided for connection to wires held within wire 82. Third and fourth electrodes 132 and 134 are likewise secured above and below piezoelectric bottom layer 126 such that a voltage can be applied there across. Note that third electrode 132 is adjacent second electrode 130, but does not come in contact therewith. Thus, voltages may be independently applied across top layer 124 and bottom layer 126. Referring to FIG. 4, third and fourth connectors 140 and 142 are coupled to third and fourth electrodes 132 and 134.

When a voltage is applied across piezoelectric top layer 124, the material bends in one direction depending on the polarity of the applied voltage. The piezoelectric layer will always be biased to flex such that the concave side of the layer is the positive polarity, whereas the convex side is the negative polarity. Therefore, if a voltage is applied across top layer 124 in the same direction as across bottom layer 126, then both piezoelectric layers will bend or at least be biased in the same direction and bias bender 94 in the same direction. Since bender 94 bears against compression flow channels 114 of piston 86, then if first electrode 128 and third electrode 132 have the negative polarity as the voltage is applied across top and bottom layers 124 and 126, the damping will be increased since bender 94 will tend to be biased strongly toward piston 86. Thus, increased damping results since the fluid flow through compression flow channels 114 is more highly restricted by bender 94 essentially having a higher spring rate under the applied voltage. Alternatively, if first and third electrodes 128 and 132 have the positive polarity and second and fourth electrodes 130 and 134 have a negative polarity, then bender 94 is biased slightly away from compression flow channels 114 to decrease the compression damping as piston 86 is forced through reservoir 54. With no voltage applied across layers 124 and 126, the normal stiffness of disk 120 then affects the flow with a medium level of damping.

Alternatively, differing levels of damping may be accomplished by changing the voltage applied across top layer 124 and bottom layer 126 rather than simply changing the polarity of the voltage applied. In the preferred embodiment of the invention, amplifiers increase the voltage from the 9-volt battery to 200 volts to be applied across the layers of piezoelectric material.

In still other alternative embodiments, a different "bender" may be used. Instead of utilizing a piezoelectric material to move the bender valve, other primary movers could change the biasing force of a bender covering a fluid channel. For example, an electromagnet could be employed to change the force of a bender against a flow orifice.

Likewise, if shim washers 90 are replaced with a bender valve such as has been described with regard to bender 94, rebound damping can be controlled by applying voltage to piezoelectric material within a disk.

Figure 6:
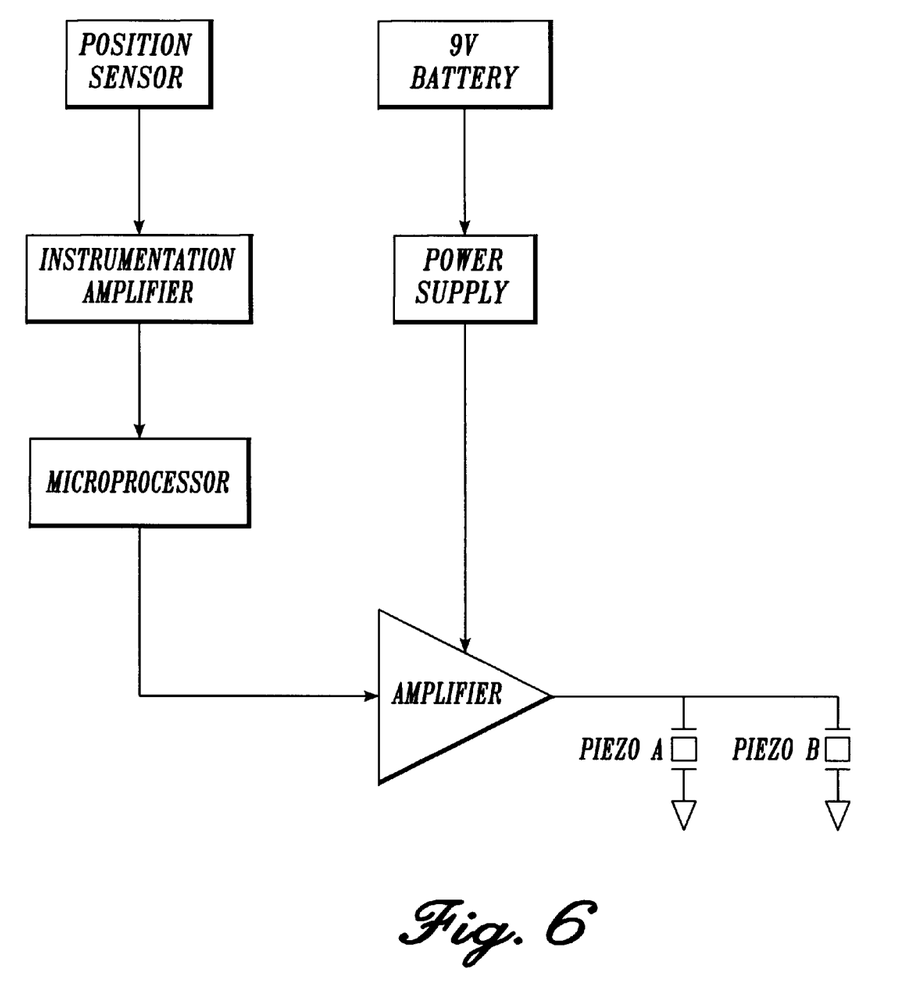
FIG. 6 is a schematic diagram of the logic circuit used to control the piezoelectric disk illustrated in FIG. 4.

FIG. 6 illustrates in a schematic diagram the basic logic to drive the two piezoelectric layers 124 and 126 within bender 94. As the shock moves, the position and velocity sensor 104 sends signals through an instrumentation amplifier to the microprocessor. The logic in the microprocessor, at predefined conditions, sends signals to the amplifier such that the power is provided through the amplifier across the piezoelectric top and bottom layers in a desirable fashion to either increase or decrease the damping level by changing the bending bias of bender 94. The amplifier changes the voltage applied across the piezoelectric material from 9 volts to preferably 200 volts. While in FIG. 6 piezos A and B are shown connected together, it should be noted that this is simply a schematic diagram and piezos A and B may be independently switched on and off of applied voltages across them in one direction or another. The specific electronics for such a circuit which would selectively apply voltages to piezoelectric top and bottom layers 124 and 126 may be readily accomplished by those skilled in the electronics arts. Alternatively, instead of a 9-volt battery, other battery or power supplies may be employed. For example, if the present system were employed on a motorcycle, the power supply could come from the motorcycle power supply (e.g., battery or magneto).

Figure 7A:
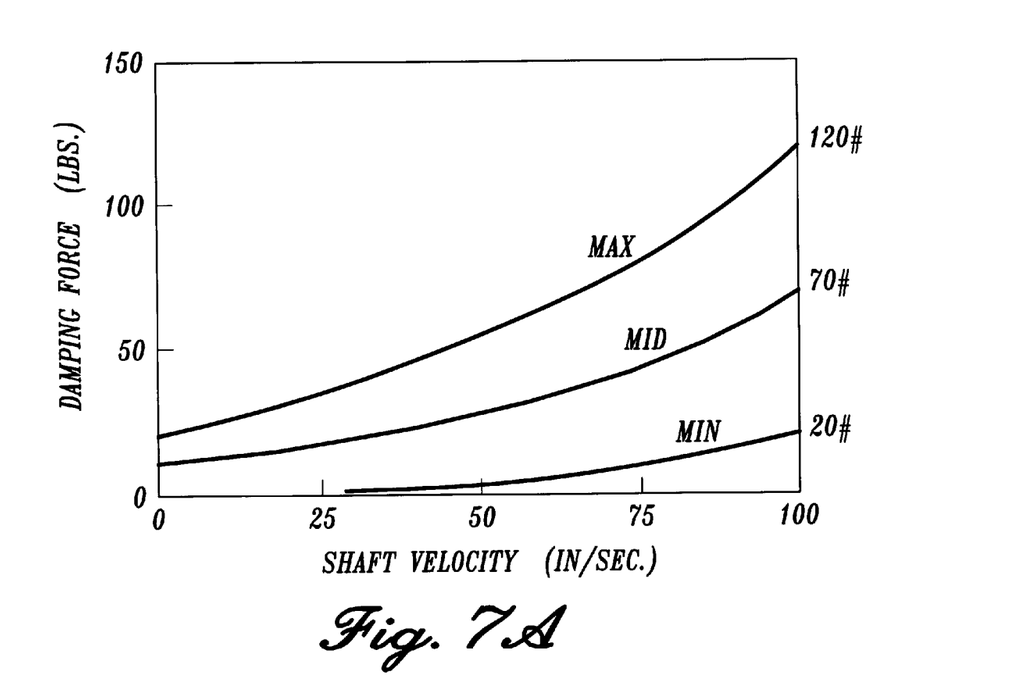
FIG. 7A graphically illustrates damping force versus shaft velocity for three levels of damping.

The damping force versus shaft velocity of the shock absorber for each of the three basic scenarios of bender 94 is illustrated in FIG. 7A. The line representing the "MID" damping force is the condition in which no voltage is applied across top and bottom layers 124 and 126 of the piezoelectric material. In this condition, bender 94 acts much like a metal shim that is deflected away from the flow through piston 86 as piston 86 is forced through hydraulic reservoir 54. With an increase in shaft velocity, the damping force naturally increases. However, if a voltage is applied across piezoelectric top and bottom layers 124 and 126 such that the negative polarity is applied to the first and third electrodes 128 and 132, a condition of maximum damping is achieved such that the damping follows the "MAX" curve shown in FIG. 7A. However, if the polarity is reversed such that bender 94 is biased away from piston 86, the damping force follows the "MIN" curve illustrated in FIG. 7A. Thus, without changing the amount of applied voltage, but just by changing the polarity of the voltage or whether the voltage is applied at all, three discreet levels of damping can be achieved. In each of these levels the damping increases with shaft velocity.

The "MID" level of damping is constructed so that the bender reacts the same as a current dampener piston assembly with shims being used instead of bender 94 such that if no power is applied to the piezoelectric layers, then the shock absorbers still provide good shock performance. This would be the case, for example, if the battery were dead or in case of some other electrical breakdown.

Figure 7B:
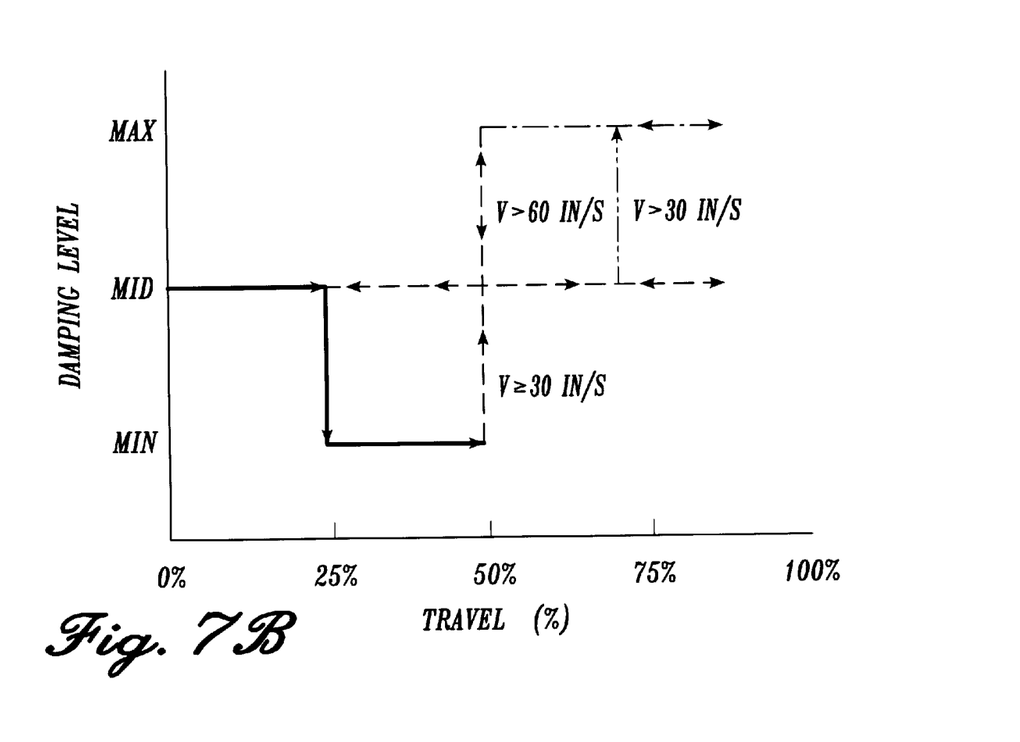
FIG. 7B graphically illustrates damping force during damping piston travel within the shock absorber of the present invention.

Referring now to FIG. 7B, a preferred programming of the dampener will be described. With a rider's weight on bicycle 10, shock absorber 30 will move to about 20% of travel. At this point, the compression damping will be at the nominal level (MID curve of FIG. 7A) to provide resistance to pogo action of the suspension system due to rider bobbing or chain-induced suspension action. Alternatively, maximum damping may be applied at this point to further reduce pogo action. However, preferably the MID level of damping is provided until approximately 25% of the travel.

As soon as the shaft moves beyond the 25% point, the system switches to minimum damping by applying the proper voltage with the proper polarity across piezoelectric layers 124 and 126. Thus, when the rider encounters low amplitude, high frequency shock, the damping is at a minimum level to be able to respond quickly to the shock and absorb it without the shock being transferred to the rider through the bike frame 12.

If the shaft goes past 50% of travel, its velocity is computed by the sensor and chip. If the velocity is greater than about 30 inches per second the system switches to the MID level of damping. This would be the case when a larger bump is encountered. If the velocity of the shaft is greater than 60 inches per second the damping would switch directly to the MAX damping level to deal with extremely large bumps. At 70% of travel, the shaft velocity will be recomputed and, if greater than 30 inches per second and not already in the stiff MAX level, then it would be switched to that level. Thus, the system will avoid the suspension completely bottoming out by providing increased compression damping to handle the large shocks.

When the shaft returns to a position less than 50% of travel, the system switches to the MID stiffness level, if it is not already there. The above is just one possible scenario that may be programmed into the logic circuit in the circuit board or chip such that the suspension damping actively and instantaneously responds to shocks encountered. The figures above for velocity and displacement are simply one set that could be used. Depending on how the shock is arranged with a given suspension system and the desired attributes of the shock, these numbers can be changed and the chip or circuit board can be programmed accordingly.

Thus, the level of damping is automatically and instantaneously changed during riding so that low amplitude, high frequency bumps are easily absorbed with minimal damping while large high amplitude low frequency bumps are absorbed with higher damping so as to not bottom out the suspension and to avoid the shock from springing back too quickly. Both velocity and displacement of the shaft relative to the reservoir housing 50 are important to proper damping. If the travel passes 50%, but the velocity is very slow, then increased damping is not required. However, if the travel passes 50% with a very high velocity, then increased damping can be effective in improved shock absorber performance. Nevertheless, alternative embodiments may also be employed where velocity by itself or displacement by itself are measured and the damping level is adjusted based on a single input. Further, other sensor input may also be employed to control damping levels.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A shock absorber for a vehicle comprising:
   (a) a fluid-filled reservoir;
   (b) an elongate member having a first end extending partially into said reservoir;
   (c) a piston secured to the first end of said elongate member and held within said reservoir for being forced through said fluid-filled reservoir to dampen the shock absorber;
   (d) at least one fluid channel in fluid communication with said reservoir through which fluid is forced when said piston is forced through said reservoir;
   (e) a bender valve at least partially blocking the flow of fluid through said fluid channel, said bender valve having a response material embedded within at least a portion thereof; and
   (f) a power supply and a biasing means attached thereto, said biasing means affecting said response material for biasing the bender valve to affect the flow through said at least one fluid channel, wherein said at least one fluid channel is disposed through said piston, such that fluid flows through said piston when said piston is forced through said reservoir, wherein said bender valve seats against said fluid channel to regulate the flow therethrough, and wherein said response material comprises a piezoelectric material, said biasing means comprising said piezoelectric material having said power supply attached across said piezoelectric material for applying a voltage thereacross.

2. The shock absorber of claim 1, wherein said bender valve is disk shaped, said piezoelectric material being connected to said power supply across the thickness of said piezoelectric material for bending of the disk shaped bender valve in one direction or the other depending on the polarity of the applied voltage.

3. The shock absorber of claim 1, wherein said fluid channel includes a first end into which fluid enters and a second end through which fluid exits as said piston is forced further into said fluid reservoir, wherein said bender valve is disposed adjacent the second end.

4. The shock absorber of claim 3, wherein said bender valve is disk shaped, said piezoelectric material being connected to said power supply across the thickness of said piezoelectric material for bending of the disk shaped bender valve in one direction or the other depending on the polarity of the applied voltage.

5. The shock absorber of claim 3, further comprising a sensor to detect shock compression conditions, wherein said sensor includes a means for changing the biasing force of said bender valve against the second end of said fluid channel when said sensor signals predetermined conditions.

6. The shock absorber of claim 5, wherein said sensor signals said bender valve to at least two discreet biasing forces.

7. The shock absorber of claim 6, wherein said piezoelectric material in said bender valve includes conductive material on the side f aces thereof, the conductive material being connected to the power supply for applying a voltage across said piezoelectric material.

8. The shock absorber of claim 7, wherein a first of said discrete biasing forces is obtained by applying a voltage across said piezoelectric material in one direction, a second of said biasing forces is obtained by applying a voltage across said piezoelectric material with reverse polarity to the first.

9. The shock absorber of claim 8, wherein a third biasing force is obtained by applying no voltage across said piezoelectric material.

10. A shock absorber for a vehicle comprising:
    (a) a fluid-filled reservoir;
    (b) an elongate member having a first end extending partially into said reservoir;

(c) a piston secured to the first end of said elongate member and held within said reservoir for being forced through said fluid-filled reservoir to dampen the shock absorber;

(d) at least one fluid channel in fluid communication with said reservoir through which fluid is forced when said piston is forced through said reservoir;

(e) a bender valve at least partially blocking the flow of fluid through said fluid channel, said bender valve having a response material embedded within at least a portion thereof;

(f) a power supply and a biasing means attached thereto, said biasing means affecting said response material for biasing the bender valve to affect the flow through said at least one fluid channel; and (g) a sensor to detect piston displacement within said reservoir, wherein said sensor includes means for changing the biasing force of said bender valve against the second end of said fluid channel when said sensor detects predetermined displacement conditions, wherein said sensor detects velocity of said piston relative to said reservoir, said sensor including a means for chanting the biasing force of said bender valve against said fluid channel when said sensor detects predetermined velocity conditions, and said sensor signals said bender valve to at least two discrete biasing forces, and wherein said response material comprises a piezoelectric material, said biasing means comprising said piezoelectric material having said power supply attached across said piezoelectric material for applying a voltage across said piezoelectric material, wherein a first biasing force is obtained with voltage applied across the piezoelectric material with a first polarity and a second biasing force is obtained with no voltage applied across the piezoelectric material.

11. The shock absorber of claim 10, wherein a third biasing force is obtained with voltage applied across the piezoelectric material with a second polarity opposite to said first polarity.

12. A shock absorber for a vehicle comprising:

(a) a fluid-filled reservoir;

(b) an elongate member having a first end extending partially into said reservoir;

(c) a piston secured to the first end of said elongate member and held within said reservoir for being forced through said fluid-filled reservoir to dampen the shock absorber;

(d) at least one fluid channel in fluid communication with said reservoir through which fluid is forced when said piston is forced through said reservoir;

(e) a bender valve at least partially blocking the flow of fluid through said fluid channel, said bender valve having a response material embedded within at least a portion thereof;

(f) a power supply and a biasing means attached thereto, said biasing means affecting said response material for biasing the bender valve to affect the flow through said at least one fluid channel; and (g) a sensor to detect piston displacement within said reservoir, wherein said sensor includes means for changing the biasing force of said bender valve against the second end of said fluid channel when said sensor detects predetermined displacement conditions, and wherein said vehicle is a bicycle for a rider and wherein said sensor increases the biasing force of said bender valve against said fluid channel in the region of piston displacement due to preload of the shock absorber from the rider's weight.

13. The shock absorber of claim 12, wherein said sensor decreases the biasing force of said bender valve against said fluid channel once the piston is past the region of displacement due to preload of the shock absorber from the rider's weight.

14. A shock absorber for a vehicle comprising:

(a) a fluid-filled reservoir;

(b) an elongate member having a first end extending partially into said reservoir;

(c) a piston secured to the first end of said elongate member and held within said reservoir for being forced through said fluid-filled reservoir to dampen the shock absorber;

(d) at least one fluid channel in fluid communication with said reservoir through which fluid is forced when said piston is forced through said reservoir;

(e) a bender valve at least partially blocking the flow of fluid through said fluid channel, said bender valve having a response material embedded within at least a portion thereof;

(f) a power supply and a biasing means attached thereto, said biasing means affecting said response material for biasing the bender valve to affect the flow through said at least one fluid channel; and (g) a sensor to detect piston displacement within said reservoir, wherein said sensor includes a means for changing the biasing force of said bender valve against the second end of said fluid channel when said sensor detects predetermined displacement conditions, said response material comprises a piezoelectric material, said biasing means comprising said piezoelectric material having said power supply attached across said piezoelectric material for applying a voltage across said piezoelectric material, said sensor changes the biasing force on the bender valve by changing the applied voltage across the piezoelectric material, and wherein a mid level of biasing force is applied by the bender valve when no voltage is applied across the piezoelectric material.

15. A shock absorber for a vehicle comprising:

(a) a fluid-filled reservoir;

(b) an elongate member having a first end extending partially into said reservoir;

(c) a piston secured to the first end of said elongate member and held within said reservoir for being forced through said fluid-filled reservoir to dampen the shock absorber;

(d) at least one fluid channel in fluid communication with said reservoir through which fluid is forced when said piston is forced through said reservoir;

(e) a bender valve at least partially blocking the flow of fluid through said fluid channel, said bender valve having a response material embedded within at least a portion thereof; and (f) a power supply and a biasing means attached thereto, said biasing means affecting said response material for biasing the bender valve to affect the flow through said at least one fluid channel, wherein said response material comprises a piezoelectric material, said biasing means comprising said piezoelectric material having said power supply attached across said piezoelectric material for applying a voltage across said piezoelectric material, and said piezoelectric material includes a top face and a bottom face, and wherein said piezoelectric material in said bender valve includes conductive material on the top and bottom faces thereof, the conductive material being connected to the power supply for applying a voltage across said piezoelectric material.

16. The shock absorber of claim 15, wherein a first biasing force is obtained with voltage applied across the piezoelectric material with a first polarity.

17. The shock absorber of claim 16, wherein a second biasing force is obtained with voltage applied across the piezoelectric material with a second polarity.

18. The shock absorber of claim 17, wherein a third biasing force is obtained with no voltage applied across the piezoelectric material.

19. The shock absorber of claim 18, further comprising a sensor to detect piston displacement and velocity conditions, wherein said sensor includes a means for changing the voltage applied across said piezoelectric material when said sensor detects predetermined conditions.

20. The shock absorber of claim 16, wherein a second biasing force is obtained with no voltage applied across the piezoelectric material.

21. A shock absorber for a bicycle having a sprung rider support and an unsprung wheel support, comprising:

(a) a fluid filled reservoir;

(b) a first mount secured to the reservoir and adapted for connection to one of the sprung rider support and the unsprung wheel support;

(c) an elongate member having a first end extending partially into said reservoir;

(d) a second mount secured to the elongate member and adapted for connection to the other of the sprung rider support and the unsprung wheel support;

(e) a piston secured to the first end of said elongate member and held within said reservoir for being forced through said fluid-filled reservoir to dampen the shock absorber;

(f) at least one fluid channel in fluid communication with said reservoir through which fluid is forced when said piston is forced through said reservoir;

(g) a bender valve at least partially blocking the flow of fluid through said fluid channel, said bender valve having a response material embedded within at least a portion thereof; and (h) a power supply and a biasing means attached thereto, said biasing means affecting said response material for biasing the bender valve to affect the flow through said at least one fluid channel, wherein said at least one fluid channel is disposed through said piston, such that fluid flows through said piston when said piston is forced through said reservoir, wherein said bender valve seats against said fluid channel to regulate the flow therethrough, and wherein said response material comprises a piezoelectric material, said biasing means comprising said piezoelectric material having said power supply attached across said piezoelectric material for applying a voltage there across.

* * * * *

UNITED STATES PATENT AND TRADEMARK OFFICE
CERTIFICATE OF CORRECTION

PATENT NO. : 5,996,745
DATED : December 7, 1999
INVENTOR(S) : E.C. Jones, Jr. et al.

It is certified that error appears in the above-identified patent and that said Letters Patent is hereby corrected as shown below:

| COLUMN | LINE | |
|---|---|---|
| [57] Pg. 1, col. 2 | Abstract 16 of text | after "to" insert --a-- |
| 12 (Claim 6, | 48 line 2 | "discreet" should read --discrete-- |
| 12 (Claim 7, | 52 line 3) | "f aces" should read --faces-- |
| 12 (Claim 8, | 57 line 3) | after "direction," insert --and-- |
| 13 (Claim 10, | 23 line 27) | "chanting" should read --changing-- |

Signed and Sealed this

Twenty-second Day of May, 2001

Attest:

NICHOLAS P. GODICI

Attesting Officer    Acting Director of the United States Patent and Trademark Office